Patented Oct. 14, 1952

2,614,113

UNITED STATES PATENT OFFICE 2,614,113

URANIUM PURIFICATION AS COMPLEXES OF ESTERS OF TRIFLUOROACETOACETIC ACID

Hermann I. Schlesinger, Chicago, Ill., and Herbert C. Brown, Detroit, Mich., assignors to the United States of America as represented by the United States Atomic Energy Commission No Drawing. Application June 5, 1946, Serial No. 674,650

12 Claims. (Cl. 260—429)

This invention relates to new and useful uranium complexes and to the recovery of uranium from aqueous solutions thereof by formation of such complexes. Specifically the invention is concerned with the complexes of uranium with fluoro substituted beta keto esters. Of particular interest are complexes wherein the carbonyl (=C=O) groups are linked by a methylene radical.

Graphically complexes of this type formed from hexavalent uranium as uranyl ion $UO_2^{+2}$ and tetravalent uranium as $U^{+4}$ may be represented by the following general structures:

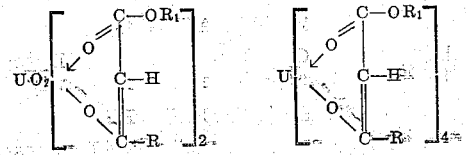

wherein $R_1$ may be alkyl, cycloalkyl or aralkyl, and R is a fluoro substituted alkyl group. In such compounds the $UO_2^{+2}$ or $U^{+4}$ is apparently linked by a covalent bond to the enolic group of the diketone and also by a coordinate bond to the other ketone group.

In accordance with the present invention it has been found that complexes of the above described class may be prepared by reacting aqueous solutions of uranium compounds capable of supplying ionic uranium preferably in the tetra or hexavalent state with a fluoro substituted beta keto ester. A 10 per cent NaOH solution is preferably added to the aqueous solution of uranium in tetravalent or hexavalent state and the fluoro substituted beta keto ester to produce a second liquid layer comprising the complex. In this connection it should be noted that the reaction mixture need not necessarily be alkaline for the reaction to proceed; however, in general it has been found that more satisfactory results are obtainable when the reaction is effected in the presence of a suitable base. The oily complex is washed with water by decantation whereby it solidifies. The solidified complex may be separated by filtration or other convenient means and washed with water. It is best purified by sublimation in vacuo, to produce a greenish solid.

In carrying out the invention uranium solutions of the type contemplated herein are contacted with a fluoro substituted beta keto ester, preferably ethyl trifluoroacetoacetate, and the mixture is made alkaline by the addition of a 10 percent NaOH solution to form water insoluble complexes such as herein described. These complexes are then precipitated or extracted with a solvent.

Suitable solvents include chloroform, benzene, ethyl acetate, carbon tetrachloride, aniline, n-hexyl alcohol, xylene, and ethyl ether. The water immiscible organic solvents used in the process of the present invention extract the uranium organic complexes from aqueous solutions either by actual solution in the solvent or by preferential wetting of the solvent. In the case of preferential wetting, the uranium complex may appear in the organic solvent as a suspension or precipitate.

As examples of suitable beta keto esters there may be mentioned benzyl trifluoroacetylacetate, cyclohexyl trifluoroacetylacetate, propyl trifluoroacetylacetate, and the like.

The compounds or complexes herein described are stable colored compositions probably of the chelate type. Due to their extreme stability they are especially valuable in the recovery of uranium from solutions thereof which contain impurities commonly associated therewith. They are generally soluble in the common organic solvents and exhibit relatively high volatilities compared with other chelated complexes. They may therefore also be used to advantage in processes employing vapor phase operations. Since most of these compositions are highly colored, they may be used as dyes or pigments.

The present invention is illustrated by the following example:

Example

An aqueous solution of uranous chloride was added to a slight excess of ethyl trifluoroacetylacetate and the mixture stirred at room temperature. A second liquid phase was produced by the addition of a 10 per cent sodium hydroxide solution thereto. When the oily liquid complex was washed with water by decantation, it solidified. On sublimation in vacuo the product distilled to form a greenish white solid condensate, uranous tetraethyl trifluoroacetoacetate, having the probable formula $U(CF_3COCHCO_2Et)_4$, and melting at 61° C. Analysis for $C_{24}H_{24}F_{12}O_{12}U$: U, Calc'd; 24.48 per cent. Found; 24.46 per cent.

Although the present invention has been described with reference to specific details of certain embodiments thereof, it is not intended that such details shall be regarded as limitations except in so far as included in the accompanying claims.

What is claimed is:

1. A complex of uranium having the general structure

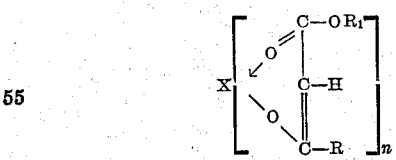

wherein X is selected from the group consisting of $UO_2$ and uranium, wherein $n$ is 2 when X is $UO_2$ and $n$ is 4 when X is uranium and wherein $R_1$ is a member from the group consisting of alkyl, cycloalkyl and aralkyl radicals and R is a trifluoromethyl radical.

2. A complex of hexavalent uranium having the general structure

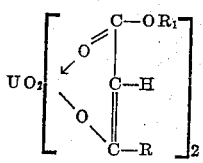

wherein $R_1$ is a member from the group consisting of alkyl, cycloalkyl and aralkyl radicals and R is a trifluoromethyl radical.

3. A complex of tetravalent uranium having the general structure

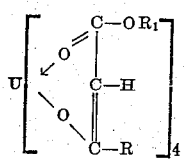

wherein $R_1$ is a member from the group consisting of alkyl, cycloalkyl and aralkyl radicals and R is a trifluoromethyl radical.

4. Uranium tetra (ethyl trifluoroacetoacetate).

5. A method for separating uranium from impurities commonly associated therewith which comprises adding to an aqueous solution containing uranium values and said impurities an ester of trifluoroacetoacetic acid, said ester having the formula $CF_3$—CO—$CH_2$—$COOR_1$ wherein $R_1$ is a member from the group consisting of alkyl, cycloalkyl and aralkyl radicals and separating the resultant uranium complex.

6. The process of claim 5 wherein the ester of trifluoroacetoacetic acid is ethyl trifluoroacetoacetate.

7. A method for separating uranium from impurities commonly associated therewith which comprises adding to an aqueous solution containing uranium values and said impurities an ester of trifluoroacetoacetic acid, said ester having the formula $CF_3$—CO—$CH_2$—$COOR_1$ wherein $R_1$ is a member from the group consisting of alkyl, cycloalkyl and aralkyl radicals, thereafter contacting the aqueous solution with an organic solvent, and separating the resultant aqueous phase and organic extract phase containing a uranium complex.

8. The process of claim 7 in which the organic solvent is chloroform.

9. The process of claim 7 in which the organic solvent is an aromatic hydrocarbon.

10. The process of claim 7 in which the solvent is benzene.

11. The process of claim 7 in which the solvent is xylene.

12. The process of claim 7 in which the organic solvent is ethyl ether.

HERMANN I. SCHLESINGER.
HERBERT C. BROWN.

REFERENCES CITED

The following references are of record in the file of this patent:

UNITED STATES PATENTS

| Number | Name | Date |
| --- | --- | --- |
| 2,156,918 | Lyons | May 2, 1939 |
| 2,161,184 | McKone et al. | June 6, 1939 |
| 2,197,498 | Guthman | Apr. 6, 1940 |
| 2,395,866 | Gutzeit | Mar. 5, 1946 |

FOREIGN PATENTS

| Number | Country | Date |
| --- | --- | --- |
| 289,493 | Great Britain | Apr. 30, 1928 |

OTHER REFERENCES

Biltz, "Zeit. Anorg. Chem.," vol. 40, pages 218 to 224 (1904).

Morgan et al., "Jour. Chem. Soc. (London), Transactions," vol. 103, page 86 (1913).

"Centralblatt," vol. 1927, I, pages 1286–1287.

Sugden, Jour. Chem. Soc. (London), 1929, page 318.

Whitmore, Organic Chemistry, pages 431 and 443 (1937), published by D. Van Nostrand Company, New York.